Inventor
Anthony J. Marshaus,

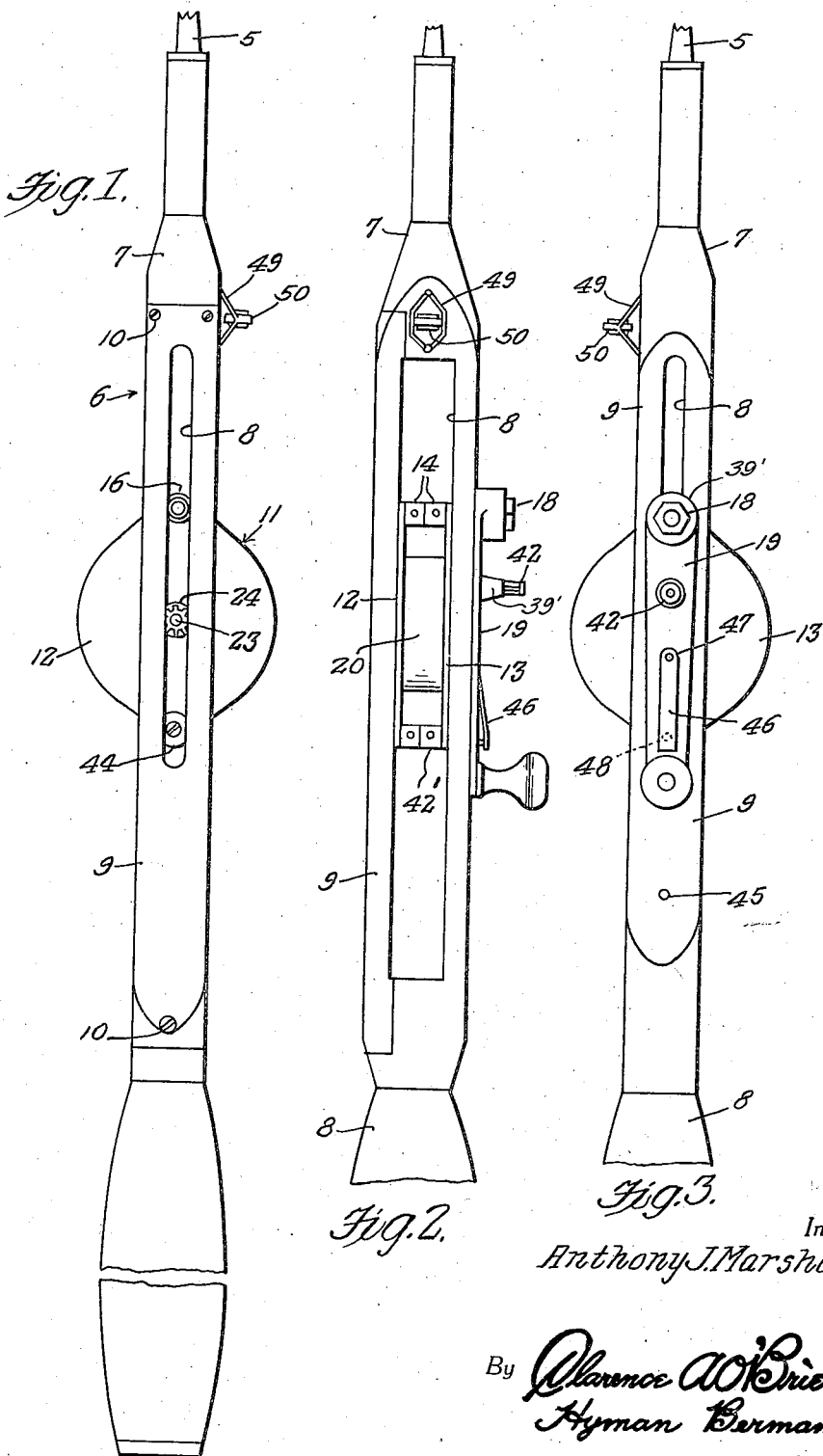

By Clarence A. O'Brien
Hyman Berman
Attorneys

Dec. 27, 1938.  A. J. MARSHAUS  2,141,817
FISHING REEL
Filed Nov. 12, 1937   3 Sheets-Sheet 3

Inventor
Anthony J. Marshaus,

By Clarence A. O'Brien
Hyman Berman
Attorneys

Patented Dec. 27, 1938

2,141,817

UNITED STATES PATENT OFFICE 2,141,817

FISHING REEL

Anthony J. Marshaus, East Cleveland, Ohio, assignor of one-half to Adolph Ebert, Cleveland, Ohio Application November 12, 1937, Serial No. 174,234

6 Claims. (Cl. 43—20)

This invention relates to fishing reels and an object of the present invention is to provide an improved spool assembly; improved means for mounting the spool assembly of the reel on the handle of the fishing rod to the end that said reel assembly may readily shift longitudinally of the handle in two directions; to provide, when desired, a positive drive for the reel; together with the operating of the reel under different speeds; the primary purpose of the invention being to provide a fishing reel of such a construction, combination and arrangement of parts as will render the same especially desirable for casting purposes.

The invention together with its objects and advantages will be best understood from a study of the following description taken in connection with the accompanying drawings wherein:

Figure 1 is an elevational view of the invention, viewing the same from one side of the handle.

Figure 2 is an elevational view taken at right angles to Figure 1.

Figure 3 is an elevational view, viewing the reel at the side of the handle opposite to that shown in Fig. 1.

Figure 7 is a sectional view through the spool assembly and a portion of the handle illustrating certain details hereinafter more fully referred to.

Figure 4:
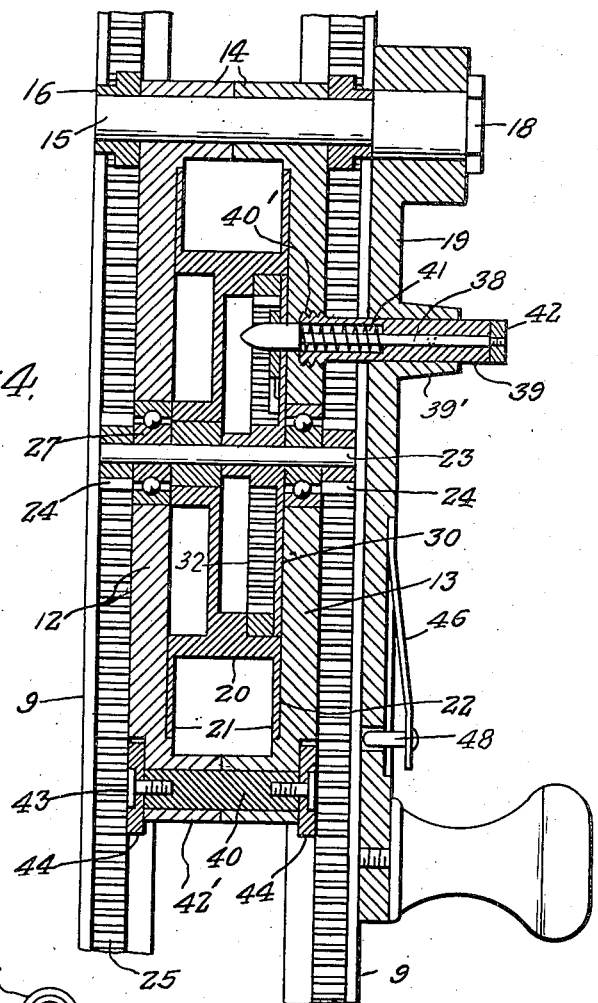
Figure 4 is an enlarged longitudinal sectional view through the spool assembly.
Figure 6:
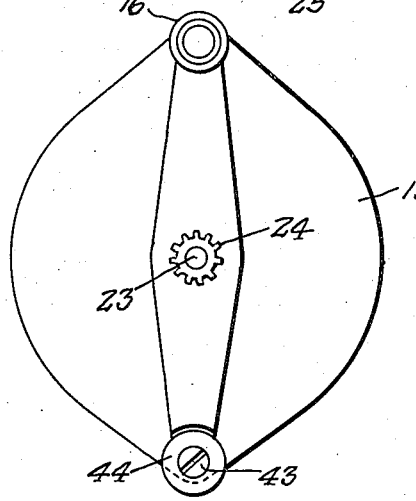
Figure 6 is a side elevational view of the spool assembly with certain parts removed.
Figure 5:
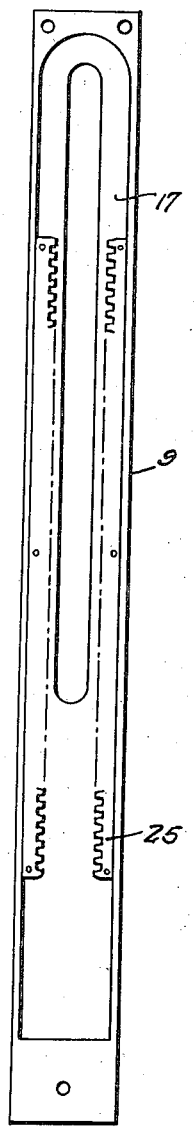
Figure 5 is an elevational view of a removable side forming part of the handle.
Figure 7:
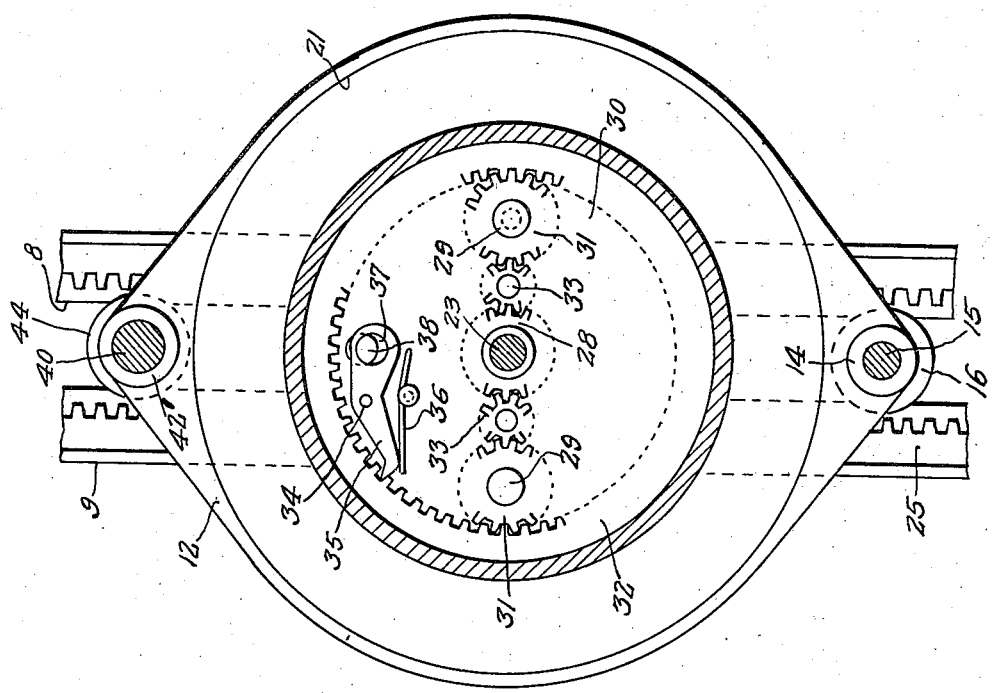

In accordance with the present invention there is provided for the fishing rod, a portion only of which is shown and indicated by the reference numeral 5, a handle 6.

The handle 6 includes a shank portion 7 having a hand grip 8 on one end thereof.

The shank portion 7 intermediate its ends is hollowed out and is substantially rectangular in cross section, each of the four sides of the hollowed portion of the shank 7 being provided with a longitudinal slot 8.

One of the sides, for example, the side 9 is removable and is detachably secured in position through the medium of screws or other fastening elements 10.

Movable longitudinally of the hollowed portion of the handle shank 7 is a spool assembly indicated generally by the reference numeral 11.

The spool assembly 11 comprises a spool holder consisting of a pair of complemental opposed plates 12, 13 which at one end are apertured and are provided with integral inwardly directed bosses 14 through which extends a shaft 15. The boss equipped end of the plates 12 and 13 is positively secured on the shaft or pin 15 through the medium of collars 16.

The collars 16 are in the form of rollers within the channels 17 in opposed sides 9 and 9' of the handle shank.

Positively secured as at 18 on one end of the shaft or pin 15 is handle 19 hereinafter more fully referred to.

Carried by the plates 12, 13 is a spool 20, the flanges 21 of which are accommodated within circular recesses 22 provided therefor on the inner faces of the plates 12, 13 as shown in Figure 4.

Extending through the hub of the spool 20 is a shaft 23, and in the form of the invention shown in Figures 1 to 7 inclusive, there are provided on the respective opposite ends of the shaft 23 pinions 24 accommodated between pairs of opposed tracks 25 provided in the channels 17 of a pair of opposed sides 9 and 9' of the handle shank and disposed at opposite sides of the slots 8 in said sides.

The tracks 25 at their respective opposite ends terminate short of the ends of the channels 17, and in the form of the invention shown in Figures 1 to 7 inclusive, the tracks 25 are in the form of rack bars with which the pinions 24 are selectively engageable.

For the shaft 23 the plates 12, 13 are provided with bearings 27 as best shown in Figure 4.

Mounted on the shaft 23 to turn therewith is a driving pinion 28, and suitably journaled as at 29 on a plate 30 fitting loose within one end of the hub of the spool 20 are pinions 31 that are in constant mesh with an internal gear 32 fixedly mounted interiorly of the hub of the spool 20.

Disposed between the pinion 28 and the pinions 31, and meshing therewith, are idler pinions 33 also suitably mounted on and carried by the plate 30.

Also pivotally mounted as at 34 on the inner side of the aforementioned plate 30 is a dog 35 that has one end thereof normally urged into engagement with the gear 32 through the medium of a suitably provided spring 36.

At the free end thereof the dog 35 is provided with an enlarged opening 37 adapted, when it is desired to move the head equipped end of the dog 35 out of engagement with the gear 32, to receive the pointed end of a release plunger 38.

Release plunger 38 has a sliding fit in a tubular guide 39 that extends through an apertured boss 39' provided therefor on the handle 19 and has an end threaded into the plate 13 as at 40'.

At the inner end thereof the guide tube 39 is hollowed out to provide a socket accommodating a spring 41, one end of which bears against the head of the plunger 38 for normally urging the same inwardly to engage in the opening 37 in the dog 35.

On the outer end of the rod of the plunger 38 is threaded a stop collar or cap 42.

From the foregoing it will be apparent that with the pinions 24 in mesh with selected rails 25 longitudinal movement of the spool carriage and spool assembly along the shank 7 of the handle will result in a drive being transmitted to the gearing 28, 33 and 31 to the spool 20 for revolving the same in a direction to pay out the line.

When it is desired to drive the spool at a relatively low speed, the plunger 38 is pushed inwardly to engage in the opening 37 of dog 35 thus moving the dog 35 against the action of spring 36 out of engagement with the gear 32.

Obviously by manipulating the handle 19 the spool-carrying plates 12, 13 are swung in the desired direction to engage the pinions 24 with a selected pair of tracks 25, the pinions 24 engaging with one pair of tracks during the movement of the spool assembly longitudinally of the handle in one direction and with a second pair of tracks 25 during the movement of the spool assembly in a reserve direction.

Completing the spool assembly is a pin 40 which extends through bosses 42' provided on the plates 12, 13 at the ends thereof remote from the bosses 14 and mounted on the end of the pin 40 through the medium of screws 43 are rollers 44 which also, as clearly shown in Figure 4, ride in the channels 17 of opposed side members 9 of the handle shank.

Also for securing the spool-carrying plates 12, 13, and the spool assembly within the hollow of the handle shank at the hand grip equipped 8 of said shank, one of the sides of the shank is provided with an opening 45 as shown in Figure 3 and suitably mounted on the handle 19 is a spring 46 anchored to the handle at one end thereof as at 47. Provided on the free end of the spring 46 is a pin 48 that is adapted to engage in the opening 45 in a manner to secure the spool carriage and spool assembly at the aforementioned end of the handle shank.

Also, on the bottom side thereof and adjacent the forward end thereof the handle shank 7 is equipped with a suitable bracket 49 in which is mounted a guide eye 50 for the line.

Figures 8, 9:
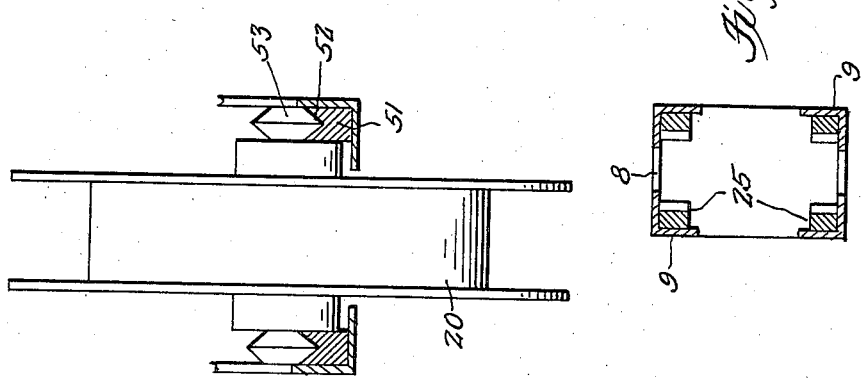
Figure 8 is a fragmentary detail view partly in section and partly in elevation illustrating a slightly modified form of the invention.
Figure 9 is a transverse sectional view through a portion of the handle illustrating further the modified form of the invention.

Instead of having the tracks 25 in the form of rack bars, said tracks, as shown in Figures 8 and 9, may be in the form of elongated strips 51 of rubber. These strips 51 are provided with substantially V-shaped grooves 52 and for cooperation with the tracks 51 there are substituted for the pinions 24 on the shaft 23 wheels 53 that have their peripheral portions of substantially V-shape in cross-section to engage conformably within the grooves 52 of tracks 51.

It will thus be seen that the wheels 53 will frictionally engage the tracks 51 so that as the spool carrier and spool assembly moves longitudinally of the handle drive will be transmitted to the spool assembly for revolving the latter to pay out the line.

It is thought that a clear understanding of the construction, utility and advantages of a fishing reel of the character contemplated by the present invention will be had without a more detailed description.

Having thus described the invention what is claimed as new is:

1. In combination, a fishing rod handle having a shank, said shank being hollow for a material portion of its length intermediate the ends of said shank, the hollow portion of the shank having sides provided with elongated slots, a reel carrier pivoted at one end thereof between two opposed sides of said shank and extending through the slots in the remaining two opposed sides of said shank, a spool revolubly supported by said spool carrier, and mechanism for positively driving said spool incidental to a longitudinal shifting movement of the spool carrier relative to said handle.

2. In combination, a fishing rod handle having a shank, said shank being hollow for a material portion of its length intermediate the ends of said shank, the hollow portion of the shank having sides provided with elongated slots, a reel carrier pivoted at one end thereof between two opposed sides of said shank and extending through the slots in the remaining two opposed sides of said shank, a spool revolubly supported by said spool carrier, and mechanism for positively driving said spool incidental to a longitudinal shifting movement of the spool carrier relative to said handle, said mechanism including pairs of opposed tracks mounted internally of the hollow of said handle shank and on the first mentioned opposed sides of said handle shank, a supporting shaft for said spool having end portions journaled in opposed sides of said spool carrier, wheels on the ends of said shaft for positive engagement with selected tracks, and transmission gearing operatively connecting said shaft with said spool for transmitting drive from the shaft to the spool.

3. In combination, a fishing rod handle having a shank, said shank being hollow for a material portion of its length intermediate the ends of said shank, the hollow portion of the shank having sides provided with elongated slots, a reel carrier pivoted at one end thereof between two opposed sides of said shank and extending through the slots in the remaining two opposed sides of said shank, a spool revolubly supported by said spool carrier, and mechanism for positively driving said spool incidental to a longitudinal shifting movement of the spool carrier relative to said handle, said mechanism including pairs of opposed tracks mounted internally of the hollow of said handle shank and on the first mentioned opposed sides of said handle shank, a supporting shaft for said spool having end portions journaled in opposed sides of said spool carrier, wheels on the ends of said shaft for positive engagement with selected tracks, and transmission gearing operatively connecting said shaft with said spool for transmitting drive from the shaft to the spool, said gearing including an internal gear mounted within the hub of said spool, a spring biased dog pivotally mounted within said hub and having an end to engage said gear, and means operable from one side of said handle for moving said dog into and out of engagement with said gear.

4. In combination, a fishing rod handle having a shank, said shank being hollow for a material portion of its length intermediate the ends of said shank, the hollow portion of the shank having sides provided with elongated slots, a reel carrier pivoted at one end thereof between two opposed sides of said shank and extending through the slots in the remaining two opposed sides of said shank, a spool revolubly supported by said spool carrier, and mechanism for positively driving said spool incidental to a longitudinal shifting movement of the spool carrier relative to said handle, said mechanism including pairs of opposed tracks mounted internally of the hollow of said handle shank and on the first mentioned opposed sides of said handle shank, a supporting shaft for said spool having end portions journaled in opposed sides of said spool carrier, wheels on the ends of said shaft for positive engagement with selected tracks, and transmission gearing operatively connecting said shaft with said spool for transmitting drive from the shaft to the spool, said gearing including an internal gear mounted within the hub of said spool, a spring biased dog pivotally mounted within said hub and having an end to engage said gear, and means operable from one side of said handle for moving said dog into and out of engagement with said gear, a handle connected to said spool carrier at the pivoted end of the latter, and interengaging means on said handle and on the shank of said fishing rod handle for securing said spool carrier and spool assembly at one end of said fishing rod handle shank and against longitudinal shifting movement relative to said shank.

5. In combination, a fishing rod handle having a shank, said shank being hollow for a material portion of its length intermediate the ends of said shank, the hollow portion of the shank having sides provided with elongated slots, a reel carrier pivoted at one end thereof between two opposed sides of said shank and extending through the slots in the remaining two opposed sides of said shank, a spool revolubly supported by said spool carrier, and mechanism for positively driving said spool incidental to a longitudinal shifting movement of the spool carrier relative to said handle, said mechanism including pairs of opposed tracks mounted internally of the hollow of said handle shank and on the first mentioned opposed sides of said handle shank, a supporting shaft for said spool having end portions journaled in opposed sides of said spool carrier, wheels on the ends of said shaft for positive engagement with selected tracks, and transmission gearing operatively connecting said shaft with said spool for transmitting drive from the shaft to the spool, said gearing including an internal gear mounted within the hub of said spool, a spring biased dog pivotally mounted within said hub and having an end to engage said gear, and means operable from one side of said handle for moving said dog into and out of engagement with said gear, a handle connected to said spool carrier at the pivoted end of the latter, and interengaging means on said handle and on the shank of said fishing rod handle for securing said spool carrier and spool assembly at one end of said fishing rod handle shank and against longitudinal shifting movement relative to said shank, the aforementioned tracks being in the form of rack bars, and the aforementioned wheels being in the form of pinions for cooperation with said rack bars to drive said shaft incidental to a longitudinal movement of the spool carrier.

6. In combination, a fishing rod handle having a shank, said shank being hollow for a material portion of its length intermediate the ends of said shank, the hollow portion of the shank having sides provided with elongated slots, a reel carrier pivoted at one end thereof between two opposed sides of said shank and extending through the slots in the remaining two opposed sides of said shank, a spool revolubly supported by said spool carrier, and mechanism for positively driving said spool incidental to a longitudinal shifting movement of the spool carrier relative to said handle, said mechanism including pairs of opposed tracks mounted internally of the hollow of said handle shank and on the first mentioned opposed sides of said handle shank, a supporting shaft for said spool having end portions journaled in opposed sides of said spool carrier, wheels on the ends of said shaft for positive engagement with selected tracks, and transmission gearing operatively connecting said shaft with said spool for transmitting drive from the shaft to the spool, said gearing including an internal gear mounted within the hub of said spool, a spring biased dog pivotally mounted within said hub and having an end to engage said gear, and means operable from one side of said handle for moving said dog into and out of engagement with said gear, a handle connected to said spool carrier at the pivoted end of the latter, and interengaging means on said handle and on the shank of said fishing rod handle for securing said spool carrier and spool assembly at one end of said fishing rod handle shank and against longitudinal shifting movement relative to said shank, said tracks being in the form of elongated strips of rubber having V-shaped longitudinal grooves in one side thereof, and said wheels having peripheral portions of substantially V-shape in cross section and having their peripheries conformably fitting with said grooves.

ANTHONY J. MARSHAUS.